United States Patent
Ives et al.

(10) Patent No.: US 10,816,316 B2
(45) Date of Patent: Oct. 27, 2020

(54) INDUCTIVE SENSOR DEVICE WITH LOCAL ANALOG-TO-DIGITAL CONVERTER

(71) Applicant: Raytheon Company, Waltham, MA (US)

(72) Inventors: Philip H. Ives, Redondo Beach, CA (US); John J. Anagnost, Torrance, CA (US)

(73) Assignee: Raytheon Company, Waltham, MA (US)

(*) Notice: Subject to any disclaimer, the term of this patent is extended or adjusted under 35 U.S.C. 154(b) by 128 days.

(21) Appl. No.: 16/056,916

(22) Filed: Aug. 7, 2018

(65) Prior Publication Data

US 2020/0049482 A1 Feb. 13, 2020

(51) Int. Cl.
*G01B 7/14* (2006.01)
*G01B 7/00* (2006.01)

(52) U.S. Cl.
CPC ............... *G01B 7/14* (2013.01); *G01B 7/001* (2013.01); *G01B 7/003* (2013.01)

(58) Field of Classification Search
CPC ........ G01R 31/40; G01R 21/06; G01R 27/26; H05K 5/03; H05K 5/0017; H02P 27/08
USPC ..................... 324/764.01, 537, 500
See application file for complete search history.

(56) References Cited

U.S. PATENT DOCUMENTS

| | | | |
|---|---|---|---|
| 4,816,759 A | 3/1989 | Ames et al. | |
| 5,477,473 A | 12/1995 | Mandl et al. | |
| 5,528,446 A * | 6/1996 | Sankaran | G01R 31/006 361/103 |
| 5,542,008 A | 7/1996 | Sugahara et al. | |
| 5,594,344 A | 1/1997 | Doyle | |
| 5,854,553 A | 12/1998 | Barclay et al. | |
| 5,886,519 A | 3/1999 | Masreliez et al. | |
| 6,148,669 A | 11/2000 | Roest | |
| 6,664,782 B2 | 12/2003 | Slates | |

(Continued)

FOREIGN PATENT DOCUMENTS

| | | |
|---|---|---|
| CN | 105547126 | 5/2016 |
| EP | 2475964 | 7/2012 |

OTHER PUBLICATIONS

International Search Report and Written Opinion for International Application No. PCT/US2018/051689 dated Jan. 7, 2019.

(Continued)

*Primary Examiner* — Giovanni Astacio-Oquendo
(74) *Attorney, Agent, or Firm* — Renner, Otto, Boisselle & Sklar, LLP

(57) ABSTRACT

A position sensor device includes a sensor head with a sensor coil, and an analog-to-digital (A/D) converter for digitizing output from the sensor coil, and sending the digital input to electronics of the device for further processing. The A/D converter is located closer to the coil than it is to the electronics, which may be in an electronics box mounted remotely from the sensor head. The A/D converter may be a part of the sensor head, may be adjacent to the sensor head, and/or may be connected to the sensor coil by an analog output cable. The analog output cable between the sensor coil and the A/D converter may be of negligible length (and of negligible capacitance), and in any event may be shorter than a digital output cable between the A/D converter and the electronics.

20 Claims, 3 Drawing Sheets

(56) References Cited

U.S. PATENT DOCUMENTS

| | | |
|---|---|---|
| 6,803,757 B2 | 10/2004 | Slates |
| 6,873,149 B1 | 3/2005 | Hoyte et al. |
| 7,324,908 B2 | 1/2008 | Browning et al. |
| 7,358,720 B1 | 4/2008 | Maier |
| 8,198,888 B2 | 6/2012 | Grommer |
| 8,564,281 B2 | 10/2013 | Filatov |
| 8,583,388 B2 * | 11/2013 | Yaguchi ............... G06F 30/367 |
| | | 702/60 |
| 9,459,369 B2 | 10/2016 | Roach et al. |
| 2003/0016028 A1 * | 1/2003 | Bass ..................... F16L 53/37 |
| | | 324/642 |
| 2005/0046593 A1 | 3/2005 | Tulpule |
| 2006/0097741 A1 * | 5/2006 | Payman ................. G01R 31/70 |
| | | 324/762.03 |
| 2007/0024274 A1 | 2/2007 | Riedel et al. |
| 2009/0140728 A1 | 6/2009 | Rollins et al. |
| 2011/0057668 A1 | 3/2011 | Chen |
| 2013/0249452 A1 | 9/2013 | Shinohara |
| 2013/0271158 A1 | 10/2013 | Thoss et al. |
| 2014/0157897 A1 | 6/2014 | Anagnost et al. |
| 2014/0182395 A1 | 7/2014 | Brandl |
| 2014/0300425 A1 | 10/2014 | Cazzaniga et al. |
| 2015/0190659 A1 * | 7/2015 | Kohler .................. A61B 5/055 |
| | | 600/411 |
| 2015/0362340 A1 | 12/2015 | Montagne |
| 2016/0025519 A1 | 1/2016 | Brunner |
| 2016/0238412 A1 | 8/2016 | Germann et al. |
| 2017/0234945 A1 * | 8/2017 | Findeklee ............. G01V 3/107 |
| | | 324/313 |
| 2017/0319097 A1 * | 11/2017 | Amthor ................ A61B 5/055 |

OTHER PUBLICATIONS

International Search Report and Written Opinion for International Application No. PCT/US2018/060618 dated Feb. 19, 2019.
International Search Report and Written Opinion for corresponding International Application No. PCT/US2019/030848 dated Jul. 23, 2019.
Co-pending U.S. Appl. No. 15/864,097, filed Jan. 8, 2018.
Co-pending U.S. Appl. No. 15/914,037, filed Mar. 7, 2018.

* cited by examiner

INDUCTIVE SENSOR DEVICE WITH LOCAL ANALOG-TO-DIGITAL CONVERTER

FIELD OF THE INVENTION

The invention is in the field of inductive sensors, such as eddy current displacement sensors.

DESCRIPTION OF THE RELATED ART

In eddy current displacement sensors, analog drive circuits are used to provide an oscillating magnetic field to sensor coils or heads, which are parts of a sensor network. The drive circuits provide an oscillating magnetic field to drive the sensor heads, typically with a frequency of about 500 kHz. The sensor network detects changes in the sensor head impedance due to the proximity of a target to the sensor head. These impedance changes are proportional to distance from target to sensor heads. The output of the sensor network is a sinusoid that must be demodulated and/or processed to determine amplitude and/or phase from which position can be determined, for example to extract position information from the signal amplitude, or alternatively processed to extract phase from the signal which also is proportional to position. Continued improvements in accuracy of such sensors is desirable.

SUMMARY OF THE INVENTION

An inductance sensor device has analog-to-digital (A/D) converters placed close to corresponding sensor heads or coils.

According to an aspect of the invention, a position sensor device includes: an operational sensor head that includes a sensor coil; an analog-to-digital converter; and electronics for determining a position of a movable target object, sensed by the sensor coil. The analog-to-digital converter receives an output signal from the sensor coil, converts the output signal to a digital signal, and sends the digital signal to the electronics. The analog-to-digital converter is physically closer to the sensor coil than to the electronics.

According to an embodiment of any paragraph(s) of this summary, the analog-to-digital converter is within 25 mm (1 inch) of the sensor head.

According to an embodiment of any paragraph(s) of this summary, the analog-to-digital converter is incorporated in the sensor head.

According to an embodiment of any paragraph(s) of this summary, the analog-to-digital converter is adjacent to the sensor head.

According to an embodiment of any paragraph(s) of this summary, a digital output cable connecting the analog-to-digital converter to the electronics is at least 0.9 meters (3 feet) long.

According to an embodiment of any paragraph(s) of this summary, a digital output cable connecting the analog-to-digital converter to the electronics is at least 3 meters long.

According to an embodiment of any paragraph(s) of this summary, a digital output cable connecting the analog-to-digital converter to the electronics is at least 6 meters long.

According to an embodiment of any paragraph(s) of this summary, the electronics include a digital demodulator that demodulates the digital signal.

According to an embodiment of any paragraph(s) of this summary, the position sensor further includes an additional operational sensor head, operatively coupled to the movable target object for determining the position of the movable target object.

According to an embodiment of any paragraph(s) of this summary, the position sensor further includes a variable electrical element operatively coupled to the sensor coil.

According to an embodiment of any paragraph(s) of this summary, the position sensor further includes a reference sensor head operatively coupled to a fixed reference target.

According to an embodiment of any paragraph(s) of this summary, output from the reference sensor head is configured to tune output from the operational sensor head.

According to an embodiment of any paragraph(s) of this summary, the variable electrical element is a variable capacitor.

According to an embodiment of any paragraph(s) of this summary, the reference sensor head includes a variable reference capacitor.

According to an embodiment of any paragraph(s) of this summary, the variable reference capacitor is operatively coupled to the variable capacitor of the operational sensor head such that changes to capacitance of the variable reference capacitor are also made to the variable capacitor of the operational sensor head.

According to an embodiment of any paragraph(s) of this summary, the reference sensor head is part of a feedback loop that adjusts capacitance of the variable reference capacitor to maintain a resonant frequency of the reference sensor head.

According to another aspect of the invention, a position sensor device includes: an operational sensor head that includes a sensor coil and an analog-to-digital converter; and electronics for determining a position of a movable target object, sensed by the sensor coil. The analog-to-digital converter receives an output signal from the sensor coil, converts the output signal to a digital signal, and sends the digital signal to the electronics.

According to yet another aspect of the invention, a position sensor device includes: an operational sensor head that includes a sensor coil; an analog-to-digital converter coupled to the sensor coil by an analog output cable; and electronics for determining a position of a movable target object as sensed by the sensor coil, the electronics coupled to the analog-to-digital converter by a digital output cable. The analog-to-digital converter receives an output signal from the sensor coil via the analog output cable, converts the output signal to a digital signal, and sends the digital signal to the electronics via the digital output cable. The analog output cable is shorter than the digital output cable.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings show various aspects of the invention.

DETAILED DESCRIPTION

A position sensor device includes a sensor head with a sensor coil, and an analog-to-digital (A/D) converter for digitizing output from the sensor head and sending the digital input to electronics of the device for further processing. The A/D converter is located closer to the head than it is to the electronics, which may be in an electronics box mounted remotely from the sensor head. The A/D converter may be a part of the sensor head, may be adjacent to the sensor head, and/or may be connected to the sensor coil by an analog output cable. The analog output cable between the sensor head and the A/D converter may be of negligible length (and of negligible capacitance), and in any event may be shorter than a digital output cable between the A/D converter and the electronics. The device has the advantage that the capacitance of the connection between the sensor coil and the A/D converter does not have much impact on the performance of the sensor device. In addition the digitization of the output signal in close proximity to the sensor head allows the sensor head to be placed a considerable distance away from the electronics, with the digital output cable having a length of 1 meter or more.

Figure 1:
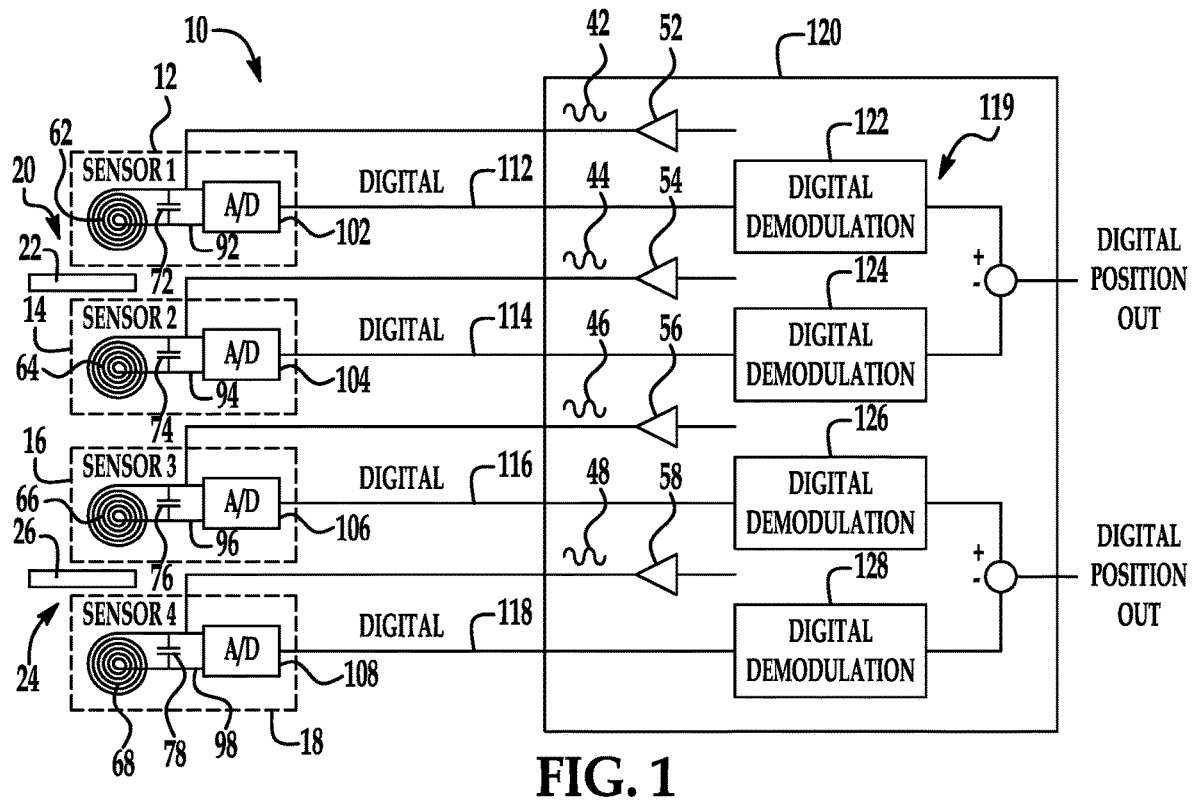
FIG. 1 is a block diagram of an impedance-based sensing device according to a first embodiment of the invention.

FIG. 1 is a schematic diagram of an inductive sensor device 10, such as an eddy current sensor device for measuring changes in location of one or more targets. The device 10 includes four operational (or active) sensor heads 12, 14, 16, and 18. The operational sensor heads 12 and 14 are used as parts of a first sensor channel 20 for determining position of a first movable target 22, and the operational sensor heads 16 and 18 are used as parts of a second sensor channel 24 for determining position of a second movable target 26. In one embodiment the targets 22 and 26 may be associated with movements of an optical device such as a mirror, with the targets 22 and 26 for example representing movement of the mirror (e.g., translational or tilting movements) in orthogonal directions. This is only one example of targets for which movement may be determined, and it will be appreciated that many other uses for inductive sensors are possible, for example for use as part of an accelerometer. The targets 22 and 26 may be made of aluminum or another suitable material, and may have any of a variety of suitable shapes, such as being plates, bars, or disks.

One or more current drives apply a periodic drive current to the sensor heads 12-18. This current is indicated in FIG. 1 by waveforms 42, 44, 46, and 48, which pass through respective current drive amplifiers 52, 54, 56, and 58, on the way to respective sensor coils 62, 64, 66, and 68 within the sensor heads 12-18. The drive current may be at a suitable frequency, for example at 500 kHz, producing oscillating magnetic fields in the sensor coils 62-68. The sensor coils 62-68 may be wound wire coils or flat spiral traces on a printed wiring board, to give non-limiting examples. The sensor heads 12-18 also have respective capacitors 72, 74, 76, and 78. The capacitors 72-78 are coupled in parallel with the corresponding respective sensor coils 62-68.

The capacitors 72-78 may include variable capacitors or alternatively (or in addition) other variable electrical elements, such as variable inductors. Variable inductors may be placed in series with the coils 62-68 instead of in parallel with the capacitors 72-78.

Output signals from the sensor heads 12-18 are passed along respective analog output cables 92, 94, 96, and 98, to respective analog-to-digital (A/D) converters 102, 104, 106, and 108. The digitized signals output from the A/D converters 102-108 are then passed through digital output cables 112, 114, 116, and 118, to electronics 119 that may be housed in an electronics box 120. The electronics box 120 may be remote from the sensor heads 12-18, and from the A/D converters 102-108.

The electronics 119 includes demodulators 122, 124, 126, and 128, which produce demodulated output signals that are combined to produce position indications regarding the positions of the targets 22 and 26. Demodulation can take the form of phase sensitive rectification, or DFT (Discrete Fourier Transform), or other means. Target position can be extracted from either amplitude or phase measurements When the distance changes between a given target 22, 26 and its associated sensor coils 62, 64, 66, and 68, the eddy currents in the targets 22 and 26 are affected in such a way as to change the effective inductance of the sensor coils 62, 64 and 66, 68, thus shifting the resonance and allowing a means by which to measure position. The change in either amplitude or phase of the output signal of the sensor heads 12-18 can be used to estimate target position, using the processed signal alone or combined with other data (such as calibration data or a look-up table, or applying a linear least squares fit (or higher order curve) to the data) to produce an output of the object displacement detected by the sensor heads 12-18 of a given channel 20, 24. For example, a sensor channel 20, 24 may be calibrated by moving the target position to known positions and comparing the sensor estimated target position to these known positions. The differences between the estimated position and known positions can then be used within the device 10 to reduce estimated position error via lookup table, or polynomial fit or other means.

One advantages feature of the sensor device 10 is that the capacitors 72-78 and the A/D converters 102-108 may be located close to their corresponding sensor coils 62-68, away from an electronics module (or electronics box) 119 that houses other electrical/electronic/processing components of the sensor device 10. This arrangement may be made in order to minimize the lengths of the analog output cables 92-98. Doing so minimizes (and/or reduces in importance) the capacitances of the analog output cables 92-98. This may enable better performance of the sensor device 10, relative to that of prior devices. For example the sensor device 10 may be used to measure movement of mirrors used for steering optical beams. Such mirrors are capable of measuring small angles with very high accuracy, a capability it is desirable to improve upon. It is desirable for such mirrors to have larger ranges of travel, for which the sensor device 10 needs to be able to measure larger ranges of travel. In order to do so it is useful to increase inductance and reduce the capacitance in the circuit, which makes controlling (and reducing) the capacitance of cables in which analog signals travel. This is only one example of a use of the sensor device 10, and many other various uses are possible.

It is noted that this approach is in some senses contrary to previous approaches in configuring inductive sensor devices. Previous approaches have involved simplifying packaging by keeping all of the electronics separate from the sensor heads. In addition separating out the A/D converters from the rest of electronics and putting the A/D converters in close proximity to the sensor heads/coils makes for additional testing and calibration steps as the sensor device is assembled.

There are many possible features that may be included in the sensor device 10 to realize some or all of these advantages. Some of these features are listed below. These features are not necessarily exclusive, and multiple of the factors may be part of the same device. The A/D converters 102-108 may be incorporated into the sensor heads 12-18. The A/D converters 102-108 may be adjacent to the sensor heads 12-18. The A/D converters 102-108 may be within 25 mm (1 inch) or otherwise in close proximity to their corresponding sensor coils 62-68. The analog output cables 92-98 between the sensor coils 62-68 and the A/D converters 102-108 may have lengths of 25 mm (1 inch) or less. The analog output cables 92-98 may be shorter than the digital output cables 112-118, and more narrowly may be shorter by at least a factor of 2, by at least a factor of 5, or by a factor of 10 or more. The digital output cables 112-118 may be much longer than previous cables connecting sensor heads and processing electronics. For example the digital output cables 112-118 may have a length of at least 0.9 meters (3 feet), of at least 1 meter, of at least 3 meters, or of at least 6 meters.

Some of these possibilities and other possibilities are illustrated in the following embodiments, which are variations on the main embodiment shown in FIG. 1. Features from the various embodiments may be combined in a single embodiment, where appropriate, and description regarding many common features of the embodiments is omitted in what follows.

Figure 2:
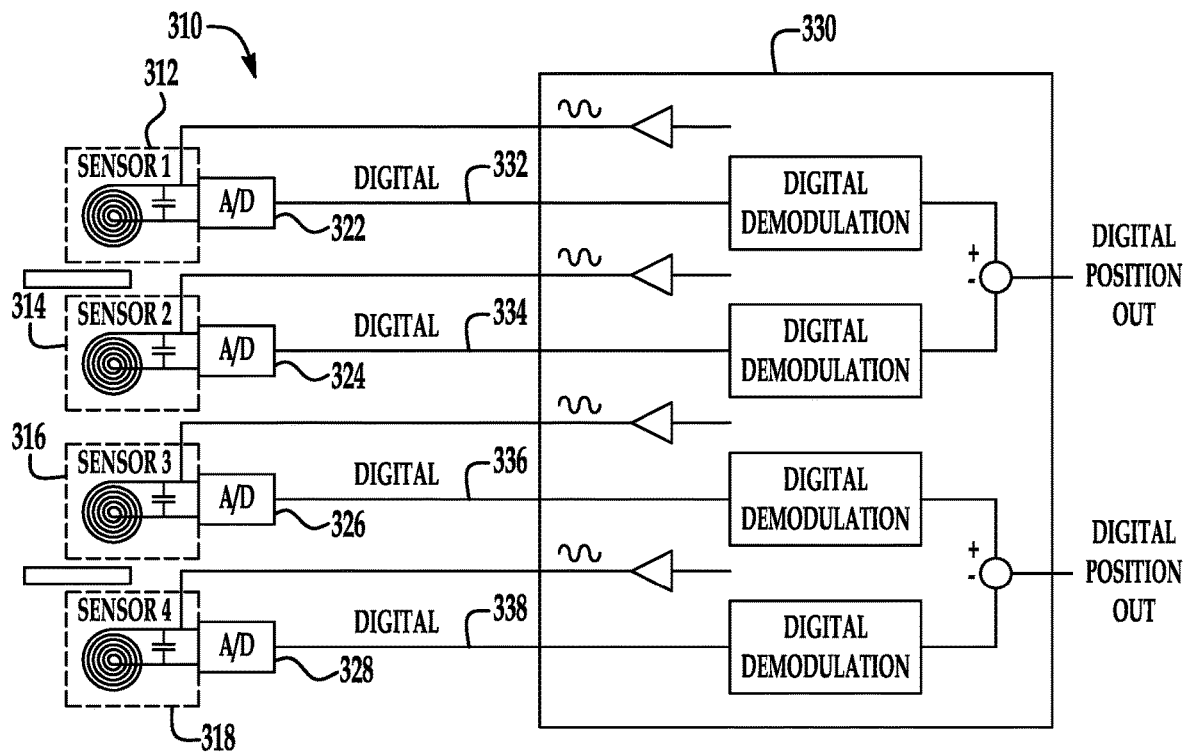
FIG. 2 is a block diagram of an impedance-based sensing device according to a second embodiment of the invention.
Figure 3:
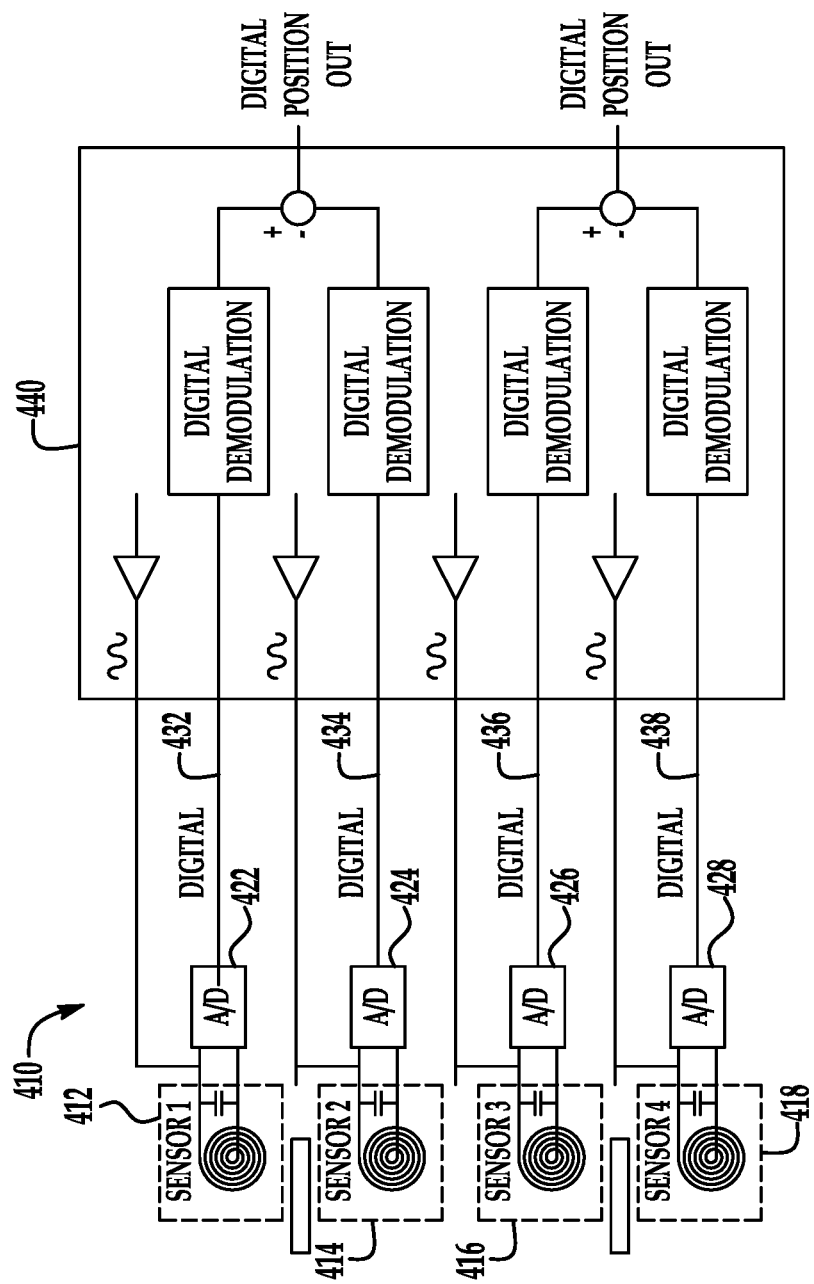
FIG. 3 is a block diagram of an impedance-based sensing device according to a third embodiment of the invention.

In FIG. 1 the sensor device 10 has the A/D converters 102-108 as parts of the sensor heads 12-18. FIGS. 2 and 3 show alternative sensor devices with A/D converters adjacent (FIG. 2) or in close proximity to (FIG. 3) sensor heads.

FIG. 2 shows a sensor device 310 that includes sensor heads 312, 314, 316, and 318. A/D converters 322, 324, 326, and 328 are adjacent to their respective sensor heads 312-318. The A/D converters 322-328 are coupled to an electronics box 330 by respective digital output cables 332, 334, 336, and 338.

FIG. 3 shows a sensor device 410 that includes sensor heads 412, 414, 416, and 418. A/D converters 422, 424, 426, and 428 are in close proximity to their respective sensor heads 412-418, with analog output cables connecting the A/D converters 422-428 to sensor coils in the sensor heads 412-418. The A/D converters 422-428 are coupled to an electronics box 440 by the digital output cables 432, 434, 436, and 438.

Figure 4:
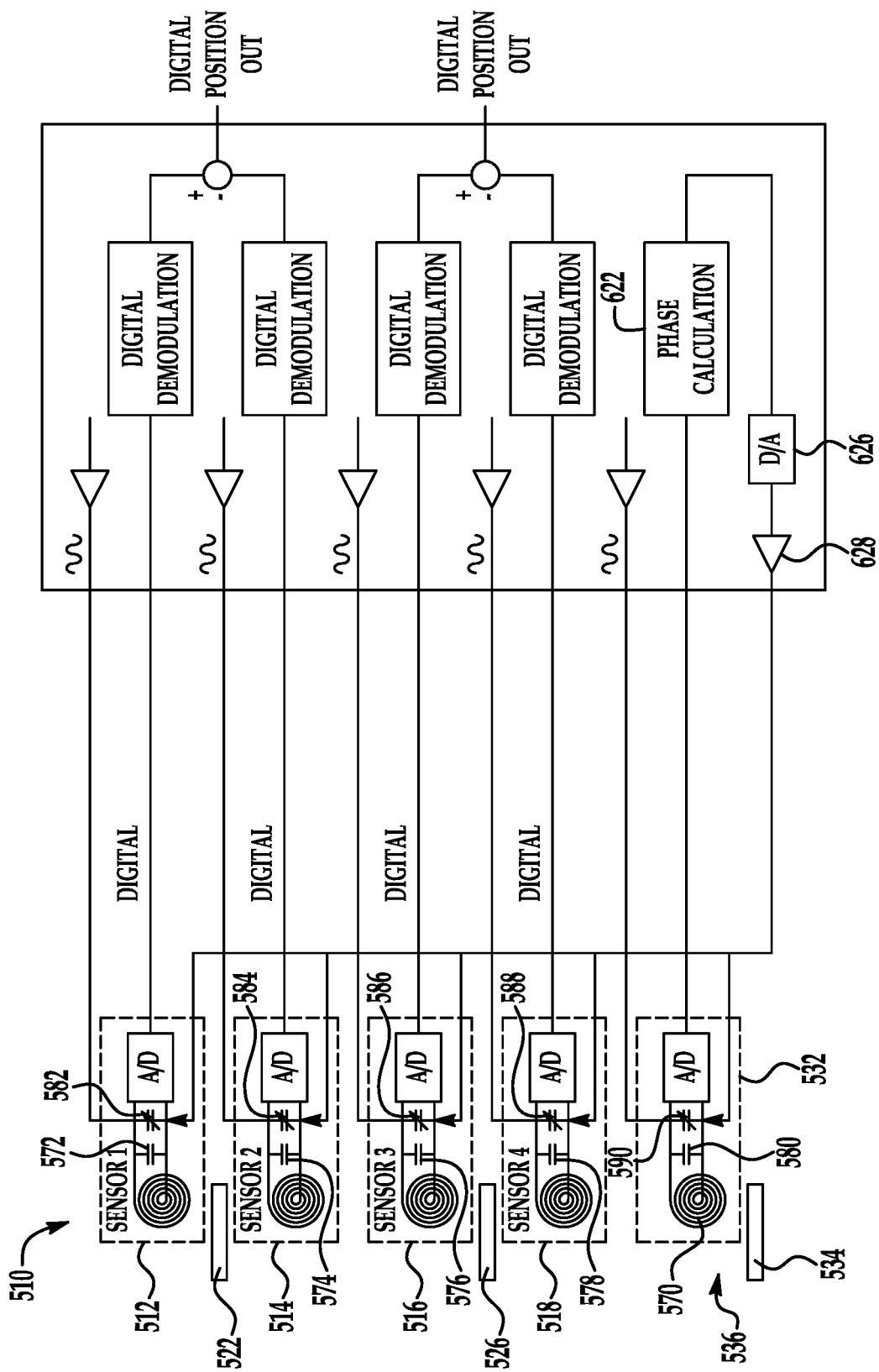
FIG. 4 is a block diagram of an impedance-based sensing device according to a fourth embodiment of the invention.

FIG. 4 shows an alternative sensor device 510 that includes a reference sensor head 532 that has a fixed reference target 534 associated with it, as parts of a reference channel 536. The reference target 534 does not move relative to the reference sensor head 532, allowing the output of the reference sensor head 532 to be used to adjust the characteristics of active or operational sensor heads 512, 514, 516, and 518, for example to compensate for effects of changes of temperature. The reference target 534 may be made of the same material as the targets 522 and 526, and/or may have the same shape as the targets 522 and 526.

The reference sensor head 532 has a sensor coil 570 coupled to a variable electrical element 590, such as a variable capacitor or inductor, that has properties that can be controllably altered to compensate for temperature or other environmental changes. The operational sensor heads 512-518 have similar variable electrical elements 582, 584, 586, and 588. As described below, the reference sensor head 532 may be used as part of a feedback loop to alter the values of the variable electrical elements 582-590 to compensate for temperature changes or other changes in condition.

The digitized reference output signal of the reference sensor head 532 is passed through a phase calculation module 622 in which changes in phase are detected, indicating changes in resonant frequency. Phase may be detected through multiple means or mechanisms, such as (for example) a Discrete Fourier Transform (DFT). Since the reference target 534 does not move, any changes in the output reference signal are due to changes in characteristics of the reference channel 536. Use of the reference channel 536 allows isolation of such changes in system characteristics, for example caused by changes in temperature, keeping such changes separate from changes in output resulting from movement of targets. This allows for compensation of the system, through the use of the variable electrical elements 582-590, to remove or at least greatly reduce the changes of system characteristics, such as those resulting from changes in temperature.

Accordingly, output from the phase calculation module 622 is expressed as a signal to change the value of the capacitance of the variable electrical element 590, with the value changed so as to compensate for the changes in phase to the output of the reference sensor head 532, to maintain the resonant frequency of the reference sensor head 532. This signal for a value change is passed through a digital-to-analog (D/A) converter 626, and through a reference channel feedback amplifier 628, before being sent on to the variable electrical elements 582, 584, 586, 588, and 590, to implement the capacitance adjustment. In essence the reference channel 536 acts as a low-bandwidth closed feedback loop, with the capacitance of the variable electrical element 590 adjusted to maintain the output signal from the reference channel 536 constant, and with the same change being made in the variable electrical elements 582-588 of the operational sensor heads 512-518. An alternative approach would be to perform the reference calculation and corresponding adjustments on command, since the changes to be compensated for are slowly changing. Such calculations and operations may be performed in software, hardware, or firmware, or any combination thereof.

The feedback signals are described above as analog signals. Alternatively the feedback signals could be in the form of digital signals, with appropriate interfaces provided at the sensor heads.

The arrangement and characteristics of the reference sensor head 532 may be similar in many respects to the arrangement and characteristics of the operational sensor heads 512-518. For example, all of fixed capacitors 572, 574, 576, 578, and 580 may have similar characteristics, and/or all of the variable electrical elements 582-590 may have similar characteristics. The similarity in characteristics between the various corresponding parts of the sensor device 510 aids in applying the tuning of the reference sensor head 532 to the operational sensor heads 512-518. However in some alternative embodiments there may be different characteristics for some parts of the different sensors, with appropriate adjustments for tuning made.

Further details regarding the use of a reference sensor may be found in co-owned U.S. application Ser. No. 15/914,037, filed Mar. 7, 2018. This application is incorporated by reference in its entirety.

The embodiments described above all have four operational sensor heads, in two channels. It will be appreciated that a greater or lesser number of sensor heads and channels may be used instead.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A position sensor device comprising:
   an operational sensor head that includes a sensor coil;
   an analog-to-digital converter; and
   electronics for determining a position of a movable target object, sensed by the sensor coil;
   wherein the analog-to-digital converter receives an output signal from the sensor coil, converts the output signal to a digital signal, and sends the digital signal to the electronics; and
   wherein the analog-to-digital converter is physically closer to the sensor coil than to the electronics.

2. The position sensor device of claim 1, wherein the analog-to-digital converter is within 25 mm (1 inch) of the sensor head.

3. The position sensor device of claim 1, wherein the analog-to-digital converter is incorporated in the sensor head.

4. The position sensor device of claim 1, wherein the analog-to-digital converter is adjacent to the sensor head.

5. The position sensor device of claim 1, wherein a digital output cable connecting the analog-to-digital converter to the electronics is at least 0.9 meters (3 feet) long.

6. The position sensor device of claim 1, wherein a digital output cable connecting the analog-to-digital converter to the electronics is at least 3 meters long.

7. The position sensor device of claim 1, wherein a digital output cable connecting the analog-to-digital converter to the electronics is at least 6 meters long.

8. The position sensor device of claim 1, wherein the electronics include a digital demodulator that demodulates the digital signal.

9. The position sensor device of claim 1, further comprising an additional operational sensor head, operatively coupled to the movable target object for determining the position of the movable target object.

10. The position sensor device of claim 1, further comprising a variable electrical element operatively coupled to the sensor coil.

11. The position sensor device of claim 1,
    further comprising a reference sensor head operatively coupled to a fixed reference target;
    wherein output from the reference sensor head is configured to tune output from the operational sensor head.

12. The position sensor device of claim 11,
    wherein the variable electrical element is a variable capacitor; and
    wherein the reference sensor head includes a variable reference capacitor.

13. The position sensor device of claim 12, wherein the variable reference capacitor is operatively coupled to the variable capacitor of the operational sensor head such that changes to capacitance of the variable reference capacitor are also made to the variable capacitor of the operational sensor head.

14. The position sensor device of claim 12, wherein the reference sensor head is part of a feedback loop that adjusts capacitance of the variable reference capacitor to maintain a resonant frequency of the reference sensor head.

15. A position sensor device comprising:
    an operational sensor head that includes a sensor coil and an analog-to-digital converter; and
    electronics for determining a position of a movable target object, sensed by the sensor coil;
    wherein the analog-to-digital converter receives an output signal from the sensor coil, converts the output signal to a digital signal, and sends the digital signal to the electronics.

16. The position sensor device of claim 15, further comprising a variable electrical element operatively coupled to the sensor coil.

17. The position sensor device of claim 16,
    further comprising a reference sensor head operatively coupled to a fixed reference target;
    wherein output from the reference sensor head is configured to tune output from the operational sensor head.

18. A position sensor device comprising:
    an operational sensor head that includes a sensor coil;
    an analog-to-digital converter coupled to the sensor coil by an analog output cable; and
    electronics for determining a position of a movable target object as sensed by the sensor coil, the electronics coupled to the analog-to-digital converter by a digital output cable;
    wherein the analog-to-digital converter receives an output signal from the sensor coil via the analog output cable, converts the output signal to a digital signal, and sends the digital signal to the electronics via the digital output cable; and
    wherein the analog output cable is shorter than the digital output cable.

19. The position sensor device of claim 18, further comprising a variable electrical element operatively coupled to the sensor coil.

20. The position sensor device of claim 19,
    further comprising a reference sensor head operatively coupled to a fixed reference target;
    wherein output from the reference sensor head is configured to tune output from the operational sensor head.

* * * * *